United States Patent

Schaub

Patent Number: 5,287,516
Date of Patent: Feb. 15, 1994

[54] DEMODULATION PROCESS FOR BINARY DATA

[75] Inventor: Thomas Schaub, Cham, Switzerland

[73] Assignee: Landis & Gyr Betriebs AG, Zug, Switzerland

[21] Appl. No.: 798,618

[22] Filed: Nov. 26, 1991

[30] Foreign Application Priority Data

Jan. 10, 1991 [CH] Switzerland ............ 00 051/91

[51] Int. Cl.$^5$ .......................... H03D 3/00; H04L 27/14
[52] U.S. Cl. .............................. 375/88; 375/89; 375/94; 329/300
[58] Field of Search .................. 329/300; 375/94, 95, 375/88, 91, 39

[56] References Cited

U.S. PATENT DOCUMENTS 4,475,219 10/1984 Puckette ............................ 375/88 X
5,099,440  3/1992 Pennebaker et al. ............... 375/54 X

*Primary Examiner*—Stephen Chin
*Assistant Examiner*—Bryan E. Webster
*Attorney, Agent, or Firm*—Meltzer, Lippe, Goldstein, Wolf, Schlissel & Sazer

[57] ABSTRACT

Two signals at different frequencies are optionally amplified or attenuated in an automatic gain control amplifier (1) after their reception, then separated from each other by means of band pass filters (2, 5) and amplitude-modulated by means of envelope curve detectors (3, 6), whereupon the envelope curve signals ($z_0[t]$, $z_1[t]$) are sampled by means of sampling switches (4, 7) once per bit to produce sample values ($z_0[kT_b]$, $z_1[kT_b]$) which are passed to a calculator unit (8) whose memory stores values of a decision table which are derived from a probability table. Each table area of the latter contains two probability values of which a first is the probability that the sample values ($z_0[kT_b]$, $z_1[kT_b]$) lie in the respective table area if the first signal were sent and a second is the probability that the sample values ($z_0[kT_b]$, $z_1[kT_b]$) lie in the respective table area if the second signal were sent. Set down in a table area of the decision table is a respective first logic value if the first probability value is greater than the second probability value and a respective second logic value if the first probability value is less than or equal to the second probability value. The process combines the advantages of the noncoherent demodulation process and the spread spectrum process.

4 Claims, 1 Drawing Sheet

DEMODULATION PROCESS FOR BINARY DATA

FIELD OF THE INVENTION

The invention relates to a demodulation process for binary data, in particular binary data which are transmitted by means of a frequency shift keying process by way of a transmission channel, wherein two shifted transmitted sinusoidal signals of different frequencies, after reception, are first separated from each other in terms of frequency and then separately amplitude-modulated for the purposes of producing two envelope curve signals.

BACKGROUND OF THE INVENTION

The demodulation process according to the invention may be used in receivers, preferably in relation to transmissions in which the noise power density spectrum of a transmission channel used, as a function of the frequency f, is not constant, and its characteristic is also not known to the receivers. Under those circumstances it is not possible to select two frequencies of a frequency shift keying process, so that the noise power density spectra of the transmission channel are as small as possible at the two frequencies, that is to say, two shifted signals of the frequency shift keying process, which belong to the two frequencies and which are both a respective function of the time are disturbed as little as possible. On the contrary it is to be expected that—if the two frequencies are close together, as is usual in a conventional frequency shift keying process—both shifted signals occur in a severely disturbed frequency range. For such situations, the use if possible of a spread band process (or "spread spectrum" process) is recommended in the literature, for example in the book "Digital Communications and Spread Spectrum Systems", R. E. Ziemer and R. L. Peterson, Macmillan Publishing Company, New York, 1985, pages 327 to 328. However such processes suffer from the disadvantage that they are expensive to carry into effect.

A process of the kind to which this invention relates is known from the publication IEEE Trans. on Communications, Sept. 86, Vol. COM-34, No. 9 "Minimax Noncoherent Detection of BFSK Signals in Nonwhite Gaussian Noise", T. Schaub and B. Steinle, pages 955 to 958, in which it is shown that if the ratio of the noise power densities at the two frequencies is not unity (see FIG. 1), a conventional noncoherent frequency shift keying receiver supplies the same reception results as if the two shifted signals were disturbed, with the same mean noise power density. Also shown therein is a possible solution as to the way in which, for the case of non unity noise power density ratio, the bit error probability of the transmitted binary data can be reduced, in comparison with the case where the ratio is unity. For that purpose, two weighting factors, with which the two shifted signals are multiplied, after they have first been previously separated from each other in the receiver and amplitude-modulated, are optimised.

The invention is based on the problem of improving the known demodulation process and realising a demodulation process which combines the simplicity of the noncoherent demodulation process with the advantages of the spread spectrum process.

SUMMARY OF THE INVENTION (i) the values of the frequencies of the two shifted signals are selected to be so far apart that the latter are disturbed independently of each other and that as far as possible at least one of the two frequencies lies in a weakly disturbed frequency range of the transmission channel;

(ii) the two envelope curve signals are sampled once per bit for the purposes of producing their sample values;

(iii) the sample values are passed to a calculator unit in whose memory values of a decision table are stored, which values are derived from the values of a probability table;

(iv) for the purposes of drawing up the probability table the value range of the sample values of each respective envelope curve signal is each in itself divided by means of threshold values into a plurality of quantisation intervals which are plotted along respective ones of two coordinate axes of the probability table for the purposes of forming the table areas thereof;

(v) for each table area of the probability table a first probability value and a second probability value are calculated and specified in the respective table area, wherein the first probability value is the probability that the sample values lie in the respective table area if the first shifted signal were sent and the second probability value is the probability that the sample values lie in the respective table area if the second shifted signal were sent;

(vi) a first logic value representing the first signal is set down in a table area of the decision table which has the same threshold values and as many table areas as the probability table if the first probability value is greater than the second probability value, and a second logic value representing the second shifted signal is set down if the first probability value is less than or equal to the second probability value and;

(vii) the calculator unit ascertains in which table area of the decision table the supplied sample values lie, whereupon it is then deduced from the logic value contained in the respective table area of the decision table whether the first or the second shifted signal was most probably sent and is therefore to be considered as the received signal.

Preferred features of the present invention are set forth in the appended claims.

BRIEF DESCRIPTION OF THE INVENTION

The same reference numerals identify the same parts in all the Figures of the drawing.

It is assumed hereinafter that binary data are transmitted by means of a frequency shift keying process by way of a transmission channel whose transmission properties alter with frequency f.

Transmission is effected by means of what is known as a BFSK-process ("Binary Frequency Shift Keying" process), that is to say a frequency shift keying process in which a shift is made between a first sinusoidal signal $s_0[t]$ at the frequency $f_0$ and a second sinusoidal signal $s_1[t]$ at the frequency $f_1$ at the rhythm of the binary data to be transmitted, that is to say at the rhythm of the bits to be transmitted, the two frequencies $f_0$ and $f_1$ being different. In that respect the first sinusoidal signal $s_0[t]$ corresponds for example to a logic value "0" while the second sinusoidal signal $s_1[t]$ corresponds to a logic value "1".

Figure 1:
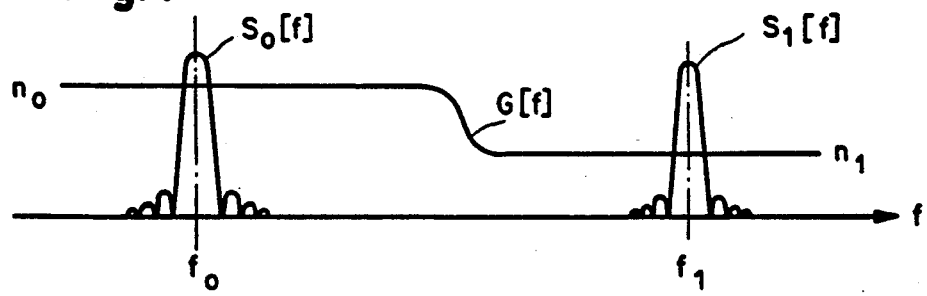
FIG. 1 is a frequency spectrum diagram of useful and interference signals.

The two signals $s_0[t]$ and $s_1[t]$ are only present during one or more bit durations in the form of carrier-frequency pulses and the band width of their respective frequency spectrum $S_0[f]$ and $S_1[f]$ is restricted. The frequency spectra $S_0[f]$ and $S_1[f]$ are in that case each symmetrical with respect to the frequencies $f_0$ and $f_1$ of the first signal $s_0[t]$ and the second signal $s_1[t]$ respectively. A noise power density spectrum $G[f]$ and a respective frequency spectrum $S_0[f]$ and $S_1[f]$ of the two signals $s_0[t]$ and $s_1[t]$ are shown in FIG. 1 as a function of the frequency f. The latter each have a main band and secondary bands, wherein the main band respectively has the frequency $f_0$ and $f_1$ as the centre frequency and all secondary bands extend symmetrically relative to the associated frequency $f_0$ and $f_1$ respectively. The noise power density spectrum $G[f]$ represents additive nonwhite Gaussian noise.

It has been assumed in FIG. 1, for the sake of simplicity of the drawing, that the entire frequency range comprises only a first frequency range and a second frequency range, in each of which there is a respective constant power noise density spectrum $G[f]=n_0$ and $G[f]=n_1$, with $n_1$ being significantly smaller than $n_0$. In the demodulation process according to the invention the values of the two frequencies $f_0$ and $f_1$ are selected to be far apart. FIG. 1 showed as a possible case the case in which the entire frequency spectrum $S_0[f]$ of the first signal $s_0[t]$ is contained entirely in the first frequency range and that $S_1[f]$ of the second signal $s_1[t]$ is contained entirely in the second frequency range. In that situation the two signals $s_0[t]$ and $s_1[t]$ are individually disturbed by the additive white Gaussian noise which, at the two frequencies $f_0$ and $f_1$, has a different noise power density $n_0$ and $n_1$ respectively. The two signals $s_0[t]$ and $s_1[t]$ are thus disturbed to different degrees upon transmission. The ratio $n_1/n_0$ is referred to hereinafter by x. It was also assumed in FIG. 1 that the two signals $s_0[t]$ and $s_1[t]$ are attenuated to equal degrees in the transmission channel so that the amplitudes of $S_0[f]$ and $S_1[f]$ are of approximately equal values.

The following apply:

$$s_0[t]=[E_b/2T_b]^{\frac{1}{2}}\cdot\cos[2\pi f_0 t] \text{ and}$$

$$s_1[t]=[E_b/2T_b]^{\frac{1}{2}}\cdot\cos[2\pi f_1 t],$$

wherein $E_b$ denotes the energy per transmitted bit and $T_b$ denotes the bit duration.

For the reception process, a noncoherent demodulation process is used in the receivers as the receivers generally do not know the phase position of the signals $s_0[t]$ and $s_1[t]$ sent. In principle however it is also possible to use the demodulation process according to the invention in relation to a coherent demodulation procedure.

The following assumptions apply in regard to an example of calculation as set out hereinafter:
  the frequency range available for the transmission comprises two frequency ranges of equal size, in each of which there is a respective interference signal with a noise power density $n_0$ and $n_1$ respectively,
  $x=n_1/n_0=-10$ dB so that the first frequency range is heavily disturbed and the second frequency range is weakly disturbed,
  $E_b/n=2E_b/[n_0+n_1]=6$ dB, which corresponds to
  $E_b/n_0=3.4$ dB and
  $E_b/n_1=13.4$ dB;
  the probability in regard to the occurrence of a heavily disturbed range is 50% and the probability for the occurrence of a weakly disturbed range is also 50%.

In a conventional frequency shift keying process in which the frequencies $f_0$ and $f_1$ are as close together as possible, there is both a 50% probability that the frequencies $f_0$ and $f_1$ are both in the first frequency range and also a 50% probability that they are in the second frequency range. Corresponding thereto, when using a noncoherent demodulation process, is a bit error probability of $$P_{e0}=0.5.\exp[-0.5.E_b/n_0]=0.167$$

in the first frequency range and $$P_{e1}=0.5.\exp[-0.5.E_b/n_1]=8.8 \cdot 10^{-6}$$

in the second frequency range so that with a 50% probability there is no meaningful transmission (see the value of $P_{e0}$) while with a 50% probability there is a very good transmission (see the value of $P_{e1}$).

In the process according to the invention on the other hand the frequencies $f_0$ and $f_1$ are as far as possible random and are selected to be so far apart that there are the following three possibilities:
  there is a 25% probability that the frequencies $f_0$ and $f_1$ both lie in a weakly disturbed frequency range. An error probability of $P_{e1}=8.8 \cdot 10^{-6}$ corresponds thereto;
  there is a 50% probability that the frequencies $f_0$ and $f_1$ each lie in a different frequency range. Corresponding thereto is an error probability of $P_{e2}=1.22 \cdot 10^{-3}$. The precise calculation of $P_{e2}$ is described hereinafter as an example of calculation in respect of equation IX;
  there is a 25% probability that the frequencies $f_0$ and $f_1$ both lie in a severely disturbed frequency range. An error probability of $P_{e0}=0.167$ corresponds thereto.

That means that the probability that at least one of the two frequencies $f_0$ and $f_1$ and therewith also at least one of the two frequency spectra $S_0[f]$ and $S_1[f]$ of the two signals $s_0[t]$ and $s_1[t]$ lies in the weakly disturbed frequency range rises from 50% to 75% so that in this case there is a good transmission while the probability of no meaningful transmission is reduced to 25%. The values of the frequencies $f_0$ and $f_1$ of the two signals $s_0[t]$ and $s_1[t]$ are thus selected to be so far apart that the latter are disturbed independently of each other and as far as possible at least one of the two frequencies $f_0$ and $f_1$ lies in a weakly disturbed frequency range of the transmission channel.

Figure 2:
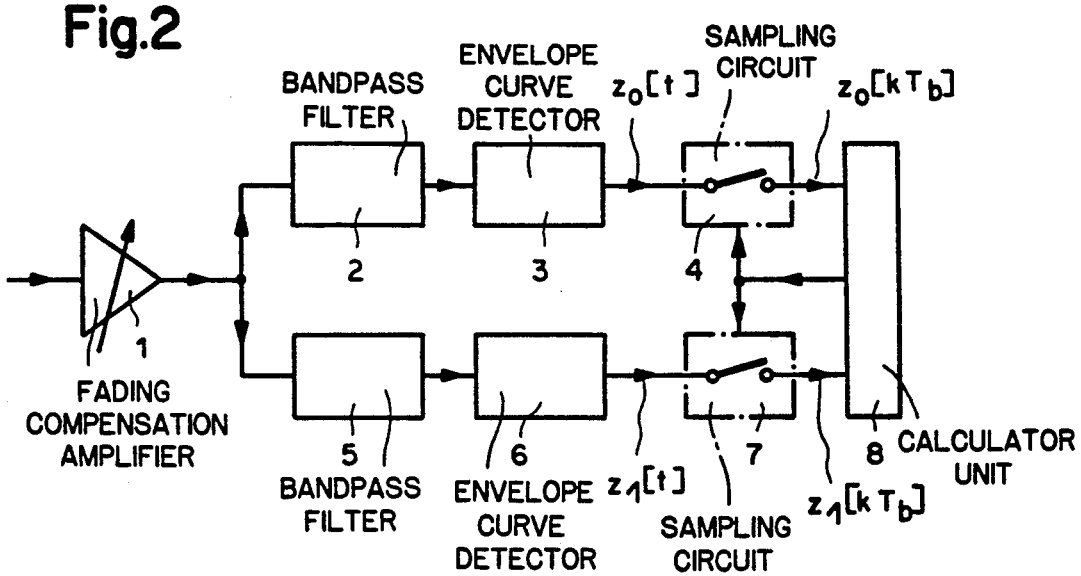
FIG. 2 shows a block circuit diagram of an arrangement for carrying out the demodulation process according to the invention.

The arrangement shown in FIG. 2 for carrying out the demodulation process according to the invention comprises an optical common fading compensation amplifier 1 ("Automatic Gain Control Amplifier"), a first band pass filter 2 for the first signal $s_0[t]$ with an associated first envelope curve detector 3 which is disposed on the output side thereof and which has on its output side an associated first sampling switch 4, a second band pass filter 5 for the second signal $s_1[t]$ with an associated second envelope curve detector 6 disposed on the output side thereof and having on its output side an associated second sampling switch 7, and a calculator unit 8. The input of the arrangement or, if provided, the output of the common automatic gain control amplifier 1 are connected to the inputs of the two band pass filters 2 and 5, the outputs of which are taken by way of the respectively associated envelope curve detectors 3 and 6 to the associated sampling switches 4 and 7 respectively, the outputs of which are in turn each connected to a respective separate input of the common calculator unit 8. An output of the latter is also connected to the two control inputs of the sampling switches 4 and 7. The centre frequency of the first band pass filter 2 is equal to the frequency $f_0$ of the first signal $s_0[t]$ and that of the second band pass filter 5 is equal to the frequency $f_1$ of the second signal $s_1[t]$. The band pass filter 2 and the envelope curve detector 3 as well as the band pass filter 5 and the envelope curve detector 6 may also each be replaced by a per se known quadrature detector. The structure of the automatic gain control amplifier 1 is known per se and is shown for example in the book "Elements of Electronic Communications", 1978, J. J. Carr, Reston Publishing Company, Inc., Reston, Va., USA, FIG. 21.7.

The two transmitted and shifted sinusoidal signals $s_0[t]$ and $s_1[t]$, after they are received in the receiver, are first separated from each other in terms of frequency by means of the band pass filters 2 and 5 and then separately amplitude-modulated in the respectively associated envelope curve detectors 3 and 6 in order to produce at the output of the latter a first envelope curve signal $z_0[t]$ and a second envelope curve signal $z_1[t]$ respectively. Each envelope curve signal $z_0[t]$ and $z_1[t]$ is sampled by means of the associated sampling switch 4 and 7 once per bit at the bit centre in order to obtain sample values $z_0[kT_b]$ of the first envelope curve signal $z_0[t]$ and sample values $z_1[kT_b]$ of the second envelope curve signals $z_1[t]$, wherein k represents a serial number of the transmitted bits contained in the signals $s_0[t]$, $s_1[t]$ and $z_0[t]$ and $z_1[t]$. The sample values $z_0[kT_b]$ and $z_1[kT_b]$ are passed to the calculator unit 8.

For the purposes of drawing up a probability table, the value range in which the sample values $z_0[kT_b]$ and $z_1[kT_b]$ of the two envelope curve signals $z_0[t]$ and $z_1[t]$ can lie, is each divided in itself by means of threshold values $w_{0,i}$ and $w_{1,j}$, into a plurality of, for example $N_0$ and $N_1$, quatisation intervals which are each plotted along a respective one of two coordinate axes of the probability table, for the purposes of forming the table areas i;j thereof. In that respect i=0, 1,1 2, . . . , $N_0$ and j=0, 1, 2, . . . , $N_i$, with $w_{0,0}=w_{1,0}=0$ and $w_{0,N0}=w_{1,N1}=$ infinite.

The number of quantisation intervals $N_0$ and $N_1$ are preferably the same. It is assumed hereinafter that $N_0=N_1=4$. In that case $w_{0,i}=1.2 \cdot i\sqrt{[n_0 \cdot B_T]}$ and $w_{1,j}=1.2 \cdot j \cdot \sqrt{[n_1 \cdot B_T]}$ for the values i and j of 1 to $N_0-1$ and 1 to $N_1-1$, wherein $B_T=1/T_b$ identifies the band width of the filters 2 and 5 contained in the receiver.

The calculator unit 8 includes a computer, preferably a microcomputer, in the memory of which the values of a decision table are fixedly stored. In that respect the values of the decision table are derived from the values of the probability table which for example looks like the following when $E_b/n=6$ dB and $x=-10$ dB.

$z_1[kT_b]$

| | | | | |
|---|---|---|---|---|
| $w_{1,3}$ | $1.66 \cdot 10^{-4}$ <br> $5.13 \cdot 10^{-1}$ | $6.47 \cdot 10^{-4}$ <br> $4.30 \cdot 10^{-1}$ | $5.78 \cdot 10^{-4}$ <br> $5.46 \cdot 10^{-2}$ | $1.42 \cdot 10^{-4}$ <br> $1.53 \cdot 10^{-3}$ |
| $w_{1,2}$ | $5.93 \cdot 10^{-4}$ <br> $4.62 \cdot 10^{-4}$ | $2.30 \cdot 10^{-2}$ <br> $3.87 \cdot 10^{-4}$ | $2.06 \cdot 10^{-2}$ <br> $4.91 \cdot 10^{-5}$ | $5.07 \cdot 10^{-3}$ <br> $1.38 \cdot 10^{-6}$ |
| $w_{1,1}$ | $4.67 \cdot 10^{-2}$ <br> $3.67 \cdot 10^{-6}$ | $1.82 \cdot 10^{-1}$ <br> $3.08 \cdot 10^{-6}$ | $1.62 \cdot 10^{-1}$ <br> $3.91 \cdot 10^{-7}$ | $4.00 \cdot 10^{-2}$ <br> $1.11 \cdot 10^{-8}$ |
| $w_{1,0}=0$ | $5.57 \cdot 10^{-2}$ <br> $0$ | $2.16 \cdot 10^{-1}$ <br> $0$ | $1.93 \cdot 10^{-1}$ <br> $0$ | $4.77 \cdot 10^{-2}$ <br> $0$ |
| | $w_{0,0}=0$ | $w_{0,1}$ | $w_{0,2}$ | $w_{0,3}$ | $z_0[kT_b]$ |

In that connection each table area i;j of the probability table has the following content:

| |
|---|
| $P_0[i,j]$ |
| $P_1[i,j]$ |

In the probability table the quantisation intervals of the sample values $z_0[kT_b]$ and $z_1[kT_b]$ of the two envelope curve signals $z_0[t]$ and $z_1[t]$ are plotted along two coordinate axes which extend perpendicularly to each other, for example the quantisation intervals of the sample values $z_0[kT_b]$ are plotted along the abscissa and those of the sample values $z_1[kT_b]$ are plotted along the ordinate. Disposed on the abscissa of the probability table are the threshold values $w_{0,0}=0$, $w_{0,1}$, $w_{0,2}$ and $w_{0,3}$ of the sample values $z_0[kT_b]$ while disposed on the ordinate are the threshold values $w_{1,0}=0$, $w_{1,1}$, $w_{1,2}$ and $w_{1,3}$ of the sample values $z_1[kT_b]$.

The probability takes has $N_0.N_1=16$ table areas i;j. For each of the table areas i;j, a first probability value $P_0[i,j]$ and a second probability value $P_1[i,j]$ are calculated and specified in the appropriate table area i;j. The first probability value $P_0[i,j]$ is to be found for example in a first line and the second probability value $P_1[i,j]$ is to be found for example in a second line therebeneath. In that connection i is the second index of that threshold value $w_{0,i}$ of the sample values $z_0[kT_b]$ and j is the second index of that threshold value $w_{i,j}$ of the sample values $z_1[kT_b]$, which both define the table area i;j towards the lower values while the upper limit values have $i+1$ and $j+1$ as an index. For example the table area 2;3 is defined downwardly by the threshold values $w_{0,2}$ and $w_{1,3}$. The first probability value $P_0[i,j]$ is the probability that the two sample values $z_0[kT_b]$ and $z_1[kT_b]$ of the envelope curve signals $z_0[t]$ and $z_1[t]$ lie in the corresponding table area i;j if the first signal $s_0[t]$ were sent while the second probability value $P_1[i,j]$ is the probability that the two sample values $z_0[kT_b]$ and $z_1[kT_b]$ of the envelope curve signals $z_0[t]$ and $z_1[t]$ lie in the respective area i;j if the second signal $s_1[t]$ were sent.

In other words:

$P_0[i,j]$ is the probability that both $w_{0,i} \leq z_0[kT_b] < w_{0,i+1}$ and also $w_{1,j} \leq z_1[kT_b] < w_{1,j+1}$, if the first signal $s_0[t]$ were sent;

$P_1[i,j]$ in contrast is the probability that both $w_{0,i} \leq z_0[kT_b] < w_{0,i+1}$ was also $w_{1,j} \leq z_1[kT_b] < w_{1,j+1}$, if the second signal $s_1[t]$ were sent;

$P_0[i,j]$ and $P_1[i,j]$ are thus the calculated probabilities that the pair of sample values $z_0[kT_b]$ and $z_1[kT_b]$ lies in the table area [i;j] on the assumption that the first signal $s_0[t]$ and that the second signal $s_1[t]$ were sent respectively.

The decision table which is derived from the probability table contains optimum decisions for the various table areas i;j and is for example of the following appearance, again on the assumption that $E_b/n=6$ dB and $x=-10$ dB.

$z_1[kT_b]$

|  | "1" | "1" | "1" | "1" |
|---|---|---|---|---|
| $w_{1,3}$ | "0" | "0" | "0" | "0" |
| $w_{1,2}$ | "0" | "0" | "0" | "0" |
| $w_{1,1}$ | "0" | "0" | "0" | "0" |

$w_{1,0}=0$            $z_0[kT_b]$
$w_{0,0}=0$   $w_{0,1}$   $w_{0,2}$   $w_{0,3}$

The decision table has the same threshold values $w_{0,i}$ and $w_{1,j}$ and as many $N_0.N_1$ table area i;j as the probability table and is drawn up using the "principle of maximum probability" (also referred to as the "Maximum Likelihood Principle") for the emitted signal $s_0[t]$ and $s_1[t]$ upon reception of the sample pair $z_0[kT_b]$; $z_1[kT_b]$. A first logic value, for example "0", which represents the first signal $s_0[t]$ is laid down in a table area i;j of the decision table if the first probability value $P_0[i,j]$ is greater than the second probability value $P_1[i,j]$, while a second logic value, for example "1", which represents the second signal $s_1[t]$ is laid down if the first probability value $P_0[i,j]$ is lower than or equal to the second probability value $P_1[i,j]$. The logic value "0" in that respect means that it is most probable that it was the first signal $s_0[t]$ that was sent and the logic value "1" means that it was most probable that it was the second signal $s_1[t]$ that was sent.

The sample values $z_0[kT_b]$ and $z_1[kT_b]$ of the two envelope curve signals $z_0[t]$ and $z_1[t]$ are passed in the calculator unit 8 to the computer which ascertains in which table area i;j of the decision table the supplied sample values $z_0[kT_b]$ and $z_1[kT_b]$ lie, whereupon it then deduces from the logic value "0" or "1" contained in the respective table area i;j whether it was most probable that it was the first or the second signal $s_0[t]$ or $s_1[t]$ that was sent and is therefore to be deemed to be the received signal. If for example $z_0[kT_b]$ is between the value $w_{0,0}=0$ and the value $w_{0,1}$ and $z_1[kT_b]$ is between the value $w_{1,1}$ and the value $w_{1,2}$, then the optimum decision is in accordance with the decision table represented; first signal $s_0[t]$ was most probably sent as a logic value "0" applies in respect of the appropriate table area i;j. If on the other hand for example $z_1[kT_b]$ is above the value $w_{1,3}$, then the optimum decision of the decision table represented is: the second signal $s_1[t]$ was most probably sent as a logic value "1" applies in respect of the corresponding table area i;j.

The novelty of the arrangement according to the invention lies in the fact that the sample values $z_0[kT_b]$ and $z_1[kT_b]$ of the envelope curve signals $z_0[t]$ and $s_1[t]$ of the two envelope curve detectors 3 and 6 are not compared to each other by means of an analog comparator as in a conventional demodulation process, so that the receiver can decide for that signal $s_0[t]$ and $s_1[t]$ respectively as the signal which it was most probable was sent, whose received envelope curve has the greater amplitude, but that the calculator unit 8 clarifies in which table area i;j of the decision table the sample values $z_0[kT_b]$ and $z_1[kT_b]$ are to be found and, on that basis, the signal $s_0[t]$ and $s_1[t]$ which is more probable for that table area i;j is deemed to be that signal which was sent.

In order to simplify the notation used and to shorten the following equations, hereinafter $z_0[kT_b]$ is replaced by $z_0$, $z_1[kT_b]$ is replaced by $z_1$, $s_0[t]$ is replaced by $s_0$ and $s_1[t]$ is replaced by $s_1$.

That then gives the following:

$$P_0[i,j] = \int_{w_{0,i}}^{w_{0,i+1}} \int_{w_{1,j}}^{w_{1,j+1}} f_{z0,z1/s0}[z_0,z_1] \cdot dz_0 \cdot dz_1 \quad \text{(I)}$$

$$P_1[i,j] = \int_{w_{0,i}}^{w_{0,i+1}} \int_{w_{1,j}}^{w_{1,j+1}} f_{z0,z1/s1}[z_0,z_1] \cdot dz_0 \cdot dz_1 \quad \text{(II)}$$

As $z_0$ and $z_1$ are statistically independent of each other, the following also apply:

$$P_0[i,j] = \int_{w_{0,i}}^{w_{0,i+1}} f_{z0/s0}[z_0] \cdot dz_0 \int_{w_{1,j}}^{w_{1,j+1}} f_{z1/s0}[z_1] \cdot dz_1 \quad \text{(III)}$$

and $$P_1[i,j] = \int_{w_{0,i}}^{w_{0,i+1}} f_{z0/s1}[z_0] \cdot dz_0 \int_{w_{1,j}}^{w_{1,j+1}} f_{z1/s1}[z_1] \cdot dz_1 \quad \text{(IV)}$$

In that connection the functions $f_{z0/s0}[z_0]$, $f_{z1/s0}[z_1]$, $f_{z0/s1}[z_0]$ and $f_{z1/s1}[z_1]$ represent the probability density function for $z_0$ and $z_1$ respectively, on the assumption that $s_0$ and $s_1$ respectively were sent.

On the assumption that the disturbance sources acting on the transmission channel involve Gaussian distribution and are additively effective, the following equations apply:

$$f_{z0/s0}[z_0] = [z_0/(n_0.B_T)].I_0[(A.z_0)/(n_0.B_T)]\cdot$$
$$\exp[-(z_0^2+A^2)/(2n_0.B_T)] \quad \text{(V)},$$

$$f_{z0/s1}[z_0] = [z_0/(n_0.B_T)] \cdot \exp[-z_0^2/(2n_0.B_T)] \quad \text{(VI)},$$

$$f_{z1/s1}[z_1] = z_1/(n_1.B_T)].I_0[(A.z_1)/(n_1.B_T)]\cdot$$
$$\exp[-(z_1^2+A^2)/(2n_1.B_T)] \quad \text{(VII)}$$

and $$f_{z1/s0}[z_0] = [z_1/(n_1.B_T)] \cdot \exp[-z_1^2/(2n_1.B_T)] \quad \text{(VIII)},$$

with $z_0>0$ and $z_1>0$ respectively. In that connection A is the amplitude of the undisturbed signal and $I_0[x]$ is the modified Bessel function of zero order.

The probability that false detection of the bit value occurs in the receiver corresponds to the probability that the sample values $z_0$ and $z_1$ lie in a table area i;j in which in the decision table there is a logic value "1", although the first signal $s_0$ was sent, and that they lie in a table area i;j in which in the decision table there is a logic value "0" although the second $s_1$ was sent.

$$P_e = 0.5 \cdot \sum_{j=0}^{N1} \sum_{i=0}^{N0} \{P_0[i,j], P_1[i,j]\}_{min} \quad \text{(IX)}$$

Therein $\{P_0[i,j], P_1[i,j]\}_{min}$ identifies the smallest of the two probability values $P_0[i,j]$ and $P_1[i,j]$ contained in a table area i;j of the probability table. The probability value $P_e$ corresponds to half the total value of all those smallest probability values contained in all table areas of the probability table.

For $N_0 = N_1 = 4$, the above-indicated probability table gives the following value for $P_e$:

$1.66 \cdot 10^{-4} + 6.47 \cdot 10^{-4} + 5.78 \cdot 10^{-4} + 1.42 \cdot 10^{-4} + 4.62 \cdot 10^{-4} + 3.87 \cdot 10^{-4} + 4.91 \cdot 10^{-5} + 1.38 \cdot 10^{-6} + 3.67 \cdot 10^{-6} + 3.08 \cdot 10^{-6} + 3.91 \cdot 10^{-7} + 1.11 \cdot 10^{-8} = 1.22 \cdot 10^{-3} = P_{e2}$.

For extreme cases, as for example x being approximately equal to one or x being very much greater than or very much smaller than one, the demodulation process according to the invention is reduced to a conventional frequency shift keying (FSK) or a conventional amplitude shift keying (ASK) demodulation process.

Then, for the case "x approximately equal to one", the decision criterion applies in the receiver: the first signal $s_0[t]$ was sent if $z_0[kT_b] \geq z_1[kT_b]$, or the second signal $s_1[t]$ was sent if $z_0[kT_b] < z_1[kT_b]$.

For the case "x much smaller than one" and thus "$n_1$ much smaller than $n_0$", the following decision criterion applies in the receiver: the second signal $s_1[t]$ was sent if $z_1[kT_b] \geq T_0$, and the first signal $s_0[t]$ was sent if $z_1[kT_b] < T_0$. In that case therefore only the sample values $z_1[kT_B]$ of the weekly disturbed signal are used for the decision.

For the case "x much smaller than one" and thus "$n_1$ much greater than $n_0$" the following decision criterion applies in the receiver: the first signal $s_0[t]$ was sent if $z_0[kT_b] \geq T_1$ and the second signal $s_1[t]$ was sent if $z_0[kT_b] < T_1$. In that case therefore only the sample values $z_0[kT_b]$ of the weekly disturbed signal are used for the decision.

In that connection $T_0$ and $T_1$ are predetermined threshold values which are preferably of the following value: $T_0 = T_1 = \sqrt{[(E_b \cdot B_T)/2]}$.

If an error-detecting or an error-correcting code is used in the transmission, then disposed downstream of the calculator unit 8 is an error-detecting or error-correcting arrangement which possibly permits what are known as "soft decisions". In the case of the latter, consideration is given not only to the logic values "1" and "0" which are ascertained by the demodulation process, but also the probabilities with which those ascertained logic values "1" and "1" coincide with the transmitted logic values. In that case the memory of the calculator unit 8, alone or as a supplement to the content of the decision table, stores the content of a metric table, for example preferably the content of the probability table; the latter may contain the probabilities in quantised or in logarithmed form. In the latter case the logarithmic values of the probabilities are present in the probability table. In those cases therefore the probability value ($P_0[i,j]$, $P_1[i,j]$) which are contained in the probability table or the logarithms of the probability values ($P_0[i,j]$, $P_1[i,j]$) contained in the probability table are stored in the memory of the calculator unit 8, in order for them to be taken into account in ascertaining the signal $s_0[t]$ or $s_1[t]$ which was most probably sent.

The application of the demodulation process according to the invention is not just restricted to transmission channels in which the two signals $s_0[t]$ and $s_1[t]$ are subjected to attenuation of equal strength, but it may also be used in those cases in which the two signals $s_0[t]$ and $s_1[t]$ are attenuated to different degrees by the transmission channel, for example with respective attenuation factors $a_0$ and $a_1$. In that case the automatic gain control amplifier 1 is then to be used. The latter automatically amplifies or attenuates the two received signals $a_0 \cdot s_0[t] + n_0[t]$ and $a_1 \cdot s_1[t] + n_1[t]$ in such a way that the useful signal components $A \cdot s_0[t]$ and $A \cdot s_1[t]$ in the output signal $s_0'[t] = A \cdot s_0[t] + (A/a_0) \cdot n_0[t]$ and $s_1'[t] = A \cdot s_1[t] + (A/a_1) \cdot n_1[t]$ of the automatic gain control amplifier 1 become of equal magnitude. Therein $n_0[t]$ and $n_1[t]$ represent the interference signals which are present in different strengths in the receiver prior to the fading compensation or gain control action at the frequencies $f_0$ and $f_1$ and A represents a proportionally constant.

Figure 3:
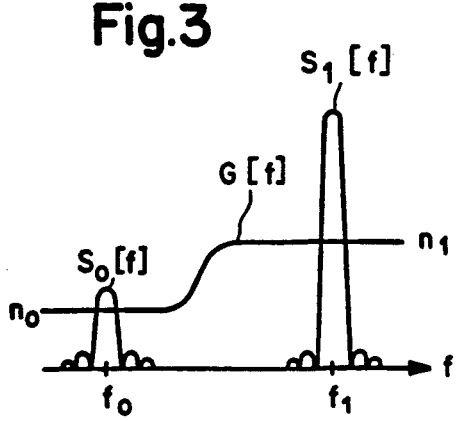
FIG. 3 shows a frequency spectrum diagram of interference and attenuated useful signals prior to fading compensation.
Figure 4:
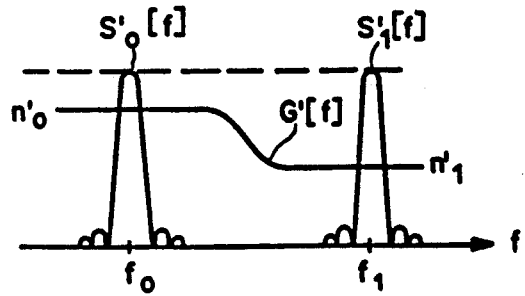
FIG. 4 shows a frequency spectrum diagram of interference and attenuated useful signals after fading compression.

FIGS. 3 and 4 each show a diagram of the frequency spectra which are present in a receiver prior to and after the gain control or fading compensation action, in respect of interference signals and useful signals which are attenuated to different degrees. Prior to the gain control or fading components effect for example the received first signal $s_0[t]$ which is heavily attenuated in the transmission channel and thus also its frequency spectrum $S_0[f]$ are significantly weaker than the received second signal $s_1[t]$ or the frequency spectrum $S_1[f]$ thereof. In addition $n_0 < n_1$. Otherwise FIG. 3 corresponds to FIG. 1. Thus, upon reception of the signals $s_0[t]$ and $s_1[t]$ which are attenuated to different degrees, prior to the separation in respect of frequency thereof at the input of the receiver, the signal $s_0[t]$ which is most greatly attenuated is so amplified by the automatic gain control amplifier 1, and the signal $s_1[t]$ which is most weakly attenuated is so attenuated, that both signals $s_0[t]$ and $s_1[t]$ become approximately equal before they are separated from each other in terms of frequency by means of the bond pass filters 2 and 5. In that respect the first signal $s_0[t]$ and the associated interference signal $n_0[t]$ is amplified and at the same time the second signal $s_1[t]$ and the associated interference signal $n_1[t]$ is attenuated, more specifically in such a way that finally the useful signal components $A \cdot s_0[t]$ and $A \cdot s_1[t]$ in the output signal of the automatic gain control amplifier 1 and therewith also the amplitudes of their frequency spectra $S'_0[f]$ and $S'_1[f]$ again become approximately equal. The noise power density spectra $n_0$ and $n_1$ of the interference signals $n_0[t]$ and $n_1[t]$ are in that case simultaneously amplified to $n'_0$ and attenuated to $n'_1$ respectively. Then, in terms of value, the amplitudes of $S'_0[f] = S'_1[f]$ lie between the amplitudes of $S_0[f]$ and $S_1[f]$. As can be seen from FIG. 4, that then again gives a starting position which is the same as the position shown in FIG. 1 in which there are identical useful signal strengths and different interference power densities, with this time $n'_0 > n'_1$.

I claim:

1. A demodulation process for binary data which are transmitted by means of a frequency shift keying process by way of a transmission channel, wherein two shifted transmitted sinusoidal signals ($s_0(t)$, $s_1(t)$) of different frequencies ($f_0$, $f_1$), after reception, are first separated from each other in terms of frequency using band-pass filter means (2, 5) and then separately amplitude-modulated using envelope curve detection means (3, 6) for the purposes of producing two envelope curve signals ($z_0(t)$, $z_1(t)$), characterized in that the values of the frequencies ($f_0$, $f_1$) of the two signals ($s_0(t)$, $s_1(t)$) are selected to be so far apart that the latter are disturbed independently of each other and that at least one of the two frequencies ($f_0$, $f_1$) lies in a weakly disturbed frequency range of the transmission channel, that the two envelope curve signals ($z_0(t)$, $z_1(t)$) are sampled once per bit using a sampling circuit means (4, 7) for the purpose of producing their sample values ($z_0(kT_b)$, $z_1(kT_b)$), that the sample values ($z_0(kT_b)$, $z_1(kT_b)$), are passed to a calculator unit (8) in whose memory values of a decision table are stored, which values are derived from the values of a probability table, that for the purposes of drawing up the probability table the value range of the sample values ($z_0(kT_b)$ and $z_1(kT_b)$) of each respective envelope curve signal ($z_0(t)$ and $z_1(t)$) is each in itself divided by means of threshold values ($w_{0,i}$ with $i=0,1,2,\ldots,N_0$ and $w_{ij}$ with $j=0,1,2,\ldots,N_1$) into a plurality ($N_0$ and $N_1$ respectively) of quantisation intervals which are plotted along respective ones of two coordinate axes of the probability table for the purposes of forming the table areas (i;j) thereof, that for each table area (i;j) of the probability table a first probability value ($P_0(i,j)$) and a second probability value ($P_1(i,j)$) is calculated and specified in the respective table area (i;j), wherein the first probability value ($P_0(i,j)$) is the probability that the sample values ($z_0(kT_b)$, $z_1(kT_b)$) lie in the respective table (i;j) if the first signal ($s_0[t]$) were sent and the second probability value ($P_1(i,j)$) is the probability that the sample values ($z_0(kT_b)$, $z_1(kT_b)$) lie in the respective table area (i;j) if the second signal ($s_1(t)$) were sent, that a first logic value ("0") representing the first signal ($s_0(t)$) is set down in a table area (i;j) of the decision table which has the same threshold values ($w_{0,i}$, $w_{1,j}$) and as many ($N_0.N_1$) table areas (i;j) as the probability table if the first probability value ($P_0(i,j)$) is greater than the second probability value ($P_1[i,j]$), and a second logic value ("1") representing the second signal ($s_1(t)$) is set down if the first probability value ($P_0(i,j)$) is less than or equal to the second probability value ($P_1(i,j)$), and that the calculator unit (8) ascertains in which table area (i;j) of the decision table the supplied sample value ($z_0(kT_b)$), $z_1(kT_b)$) lie, whereupon it is then deduced from the logic value ("0" or "1") contained in the respective table area (i;j) of the decision table whether the first or the second signal ($s_0(t)$ or $s_1(t)$) was most probably sent and is therefore to be considered as the received signal.

2. A demodulation process according to claim 1 characterized in that for the reception of signals ($s_0(t)$, $s_1(t)$) which are attenuated to different degrees, prior to the separation thereof in terms of frequency at the input of a receiver the most heavily attenuated signal ($s_0(t)$) is so amplified using amplification means (1) and the most weakly attenuated signal ($s_1(t)$) is so attenuated that both signals ($s_0(t)$, $s_1(t)$) become at least approximately equal before they are separate from each other in respect of frequency.

3. A demodulation process according to claim 1 or claim 2 whereby the probability values ($P_0(i,j)$, $P_1(i,j)$) contained in the probability table are stored in the memory of the calculator unit (8) in order for them to be taken into account in ascertaining the signal ($s_0(t)$ or $s_1(t)$) which was most probably sent.

4. A demodulation process according to claim 1 or claim 2 whereby the logarithms of the probability values ($P_0(i,j)$, $P_1(i,j)$ contained in the probability table are stored in the memory of the calculator unit (8) in order for them to be taken into account in ascertaining the signal ($s_0(t)$ or $s_1(t)$) which was most probably sent.

* * * * *